UNITED STATES PATENT OFFICE 2,143,676

PREPARATION OF THE REDUCTO-DEHYDROCHOLIC ACID ESTERS

Max Bockmühl, Gustav Ehrhart, and Heinrich Ruschig, Frankfort-on-the-Main-Hochst, Germany, assignors to Winthrop Chemical Company, Inc., New York, N. Y., a corporation of New York No Drawing. Application August 28, 1936, Serial No. 98,402. In Germany September 4, 1935

3 Claims. (Cl. 260—397)

The present invention relates to the preparation of the reducto-dehydrocholic acid esters, more particularly to the catalytic reduction of the dehydrocholic acid ester into the reducto-dehydrocholic acid ester.

The reducto-dehydrocholic acid has the following formula:

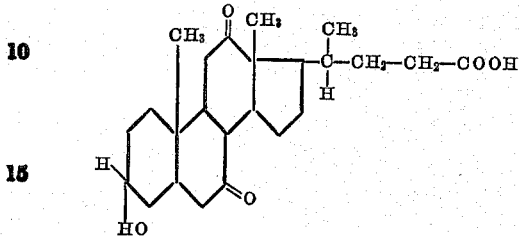

It has hitherto been prepared in such a manner that the dehydrocholic acid of the following formula:

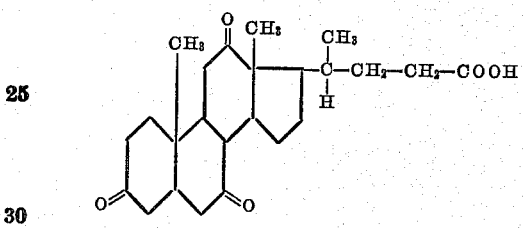

itself or one of the esters thereof are catalytically hydrogenized in an acid medium with the aid of a noble metal whereby the carbonyl group in the 3-position is reduced to a secondary alcohol group.

This process is not suitable for the preparation of large quantities on account of the strong dilution; furthermore the hydrogenation often proceeds too far.

Now we have found that the dehydrocholic acid or the esters thereof can be hydrogenized at a raised temperature and a raised pressure with the aid of a nickel catalyst in a neutral solvent. As neutral medium there may be used, for instance, aliphatic alcohols and so on.

The hydrogenation may be carried out at temperatures of from about 70° C. to about 120° C. and with application of a hydrogen pressure of at least 10 atmospheres and suitably of 40 atmospheres. Instead of nickel, cobalt may be used as a catalyst.

Also by this method of operation the carbonyl group in the 3-position is alone reduced.

The following example serves to illustrate the invention but it is not intended to limit it thereto:

20 grams of dehydrocholic acid ethylester are hydrogenized for 2 hours at 90° C. to 100° C. and for 1½ hours at 120° C. in 200 cc. of absolute ethylalcohol with 3 grams of a nickel catalyst with application of 40 atmospheres of hydrogen pressure. The catalyst is filtered and the filtrate is concentrated in a vacuum; the residue is recrystallized from 4 times its weight of methylalcohol. The yield amounts to 16.5 grams=82 per cent of the theory. The melting point of the reducto-dehydrocholic acid ethylester thus obtained lies at 153° C.

We claim:

1. In the process for the preparation of the reducto-dehydrocholic acid esters the steps which comprise causing hydrogen to act upon a simple ester of dehydrocholic acid in a neutral medium in the presence of a catalyst of the group consisting of cobalt and nickel at a temperature of at least 70° C. and a pressure of at least 10 atmospheres.

2. In the process for the preparation of the reducto-dehydrocholic acid esters the steps which comprise causing hydrogen to act upon a simple ester of dehydrocholic acid in an alcoholic solution at a temperature of about 70° C. to about 120° C. with application of a pressure of at least 10 atmospheres in the presence of nickel as a catalyst.

3. In the process for the preparation of the reducto-dehydrocholic acid esters the steps which comprise causing hydrogen to act upon a simple ester of dehydrocholic acid in absolute ethylalcohol at a temperature of about 90° C. to about 120° C. with application of a pressure of about 40 atmospheres in the presence of nickel as a catalyst.

MAX BOCKMÜHL.
GUSTAV EHRHART.
HEINRICH RUSCHIG.